Figure 1:
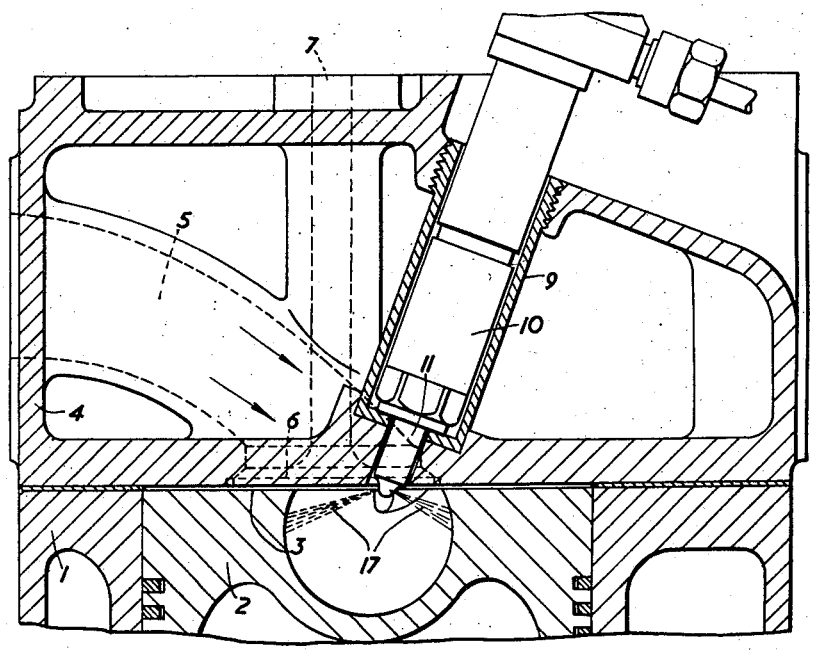

Aug. 11, 1959  G. A. HOLT  2,898,894
INTERNAL COMBUSTION ENGINES OF THE LIQUID
FUEL INJECTION COMPRESSION IGNITION TYPE
Filed Dec. 19, 1957  4 Sheets-Sheet 1

INVENTOR
GEORGE A. HOLT
BY
Watson, Cole, Grindle & Watson
ATTORNEYS

Aug. 11, 1959  G. A. HOLT  2,898,894
INTERNAL COMBUSTION ENGINES OF THE LIQUID
FUEL INJECTION COMPRESSION IGNITION TYPE
Filed Dec. 19, 1957  4 Sheets-Sheet 2

INVENTOR
GEORGE A. HOLT

BY
Watson, Cole, Grindle, & Watson
ATTORNEYS

Aug. 11, 1959 G. A. HOLT 2,898,894
INTERNAL COMBUSTION ENGINES OF THE LIQUID
FUEL INJECTION COMPRESSION IGNITION TYPE
Filed Dec. 19, 1957 4 Sheets-Sheet 3

INVENTOR
GEORGE A. HOLT

BY
Watson, Cole, Grindle & Watson
ATTORNEYS

Aug. 11, 1959 G. A. HOLT 2,898,894
INTERNAL COMBUSTION ENGINES OF THE LIQUID
FUEL INJECTION COMPRESSION IGNITION TYPE
Filed Dec. 19, 1957 4 Sheets-Sheet 4

INVENTOR
GEORGE A. HOLT

BY
Watson, Cok, Grindle & Watson
ATTORNEYS

United States Patent Office 2,898,894
Patented Aug. 11, 1959

2,898,894

INTERNAL COMBUSTION ENGINES OF THE LIQUID FUEL INJECTION COMPRESSION IGNITION TYPE

George Allen Holt, Shoreham-by-Sea, England, assignor to Ricardo & Co., Engineers (1927) Limited, London, England, a British company Application December 19, 1957, Serial No. 703,803

Claims priority, application Great Britain December 20, 1956

11 Claims. (Cl. 123—32)

This invention relates to internal combustion engines of the liquid fuel injection compression ignition type.

Engines of the above type in common use have various different forms of combustion chambers and disposition and type of fuel injection devices, one of the main objects of each arrangement being to bring the largest possible proportion of the air charge into contact with the fuel jet or jets during the combustion process and thus provide for satisfactory engine performance.

The main desirable qualities in engines of the liquid fuel injection compression ignition type may be summarised as (1) the ability to use as high a proportion of the air available in the combustion chamber as possible, (2) good fuel economy, (3) exhaust cleanliness, (4) good starting, (5) flexibility and efficiency of performance over a wide speed range and (6) smoothness of operation, and although many forms of combustion chambers as at present in use have a combination of some of these desirable qualities to a reasonably high degree, no form of combustion chamber at present in use appears capable of providing all the desirable qualities to a satisfactorily high degree.

In one particular type of liquid fuel injection compression ignition engine now in common use, and herein referred to as the direct injection engine, the piston and cylinder head are generally formed to provide between them at the end of the compression stroke a combustion space in substantially free communication with the interior of the cylinder, the fuel being injected into such space.

The arrangement of fuel injection in relation to the air charge in the direct injection combustion chamber varies somewhat but in some kinds the air charge is caused to have an organised movement or flow pattern within the combustion space substantially to match the fuel injection characteristics thus to provide as efficient a combustion process as possible. Usually in engines of this kind a combustion pocket is formed by a circular recess in the piston crown somewhat smaller in diameter than that of the piston, but the pocket may be formed partly or wholly in the cylinder head.

Moreover in some cases the air charge is caused to rotate bodily within the cylinder about the cylinder axis during the induction or air charging period so that this air charge when transferred into the pocket at the end of the compression stroke is similarly rotating but at an appreciably higher rotational velocity than that originally attained in the cylinder itself. The arrangements for fuel injection vary both in regard to the disposition of the nozzle and in the direction of the jet in relation to the circumferential wall of the combustion pocket.

The object of the present invention is to provide an improved form of internal combustion engine of the liquid fuel injection compression ignition type which may be regarded as generally of the direct injection kind and which while retaining at least most of the advantages of this kind as at present in use, will also have additional advantages.

An internal combustion engine of the liquid fuel injection compression ignition type according to the present invention comprises a piston and cylinder so formed as to provide between the piston and cylinder head at the end of each compression stroke at least two approximately similar combustion pockets, so disposed that at the end of the compression stroke the air charge compressed into each pocket is in a state of approximately similar movement, and means for injecting fuel approximately similarly into the air charge in each pocket.

The references above to the air charge compressed into each pocket being in a state of approximately similar movement and to the means for injecting fuel approximately similarly into the air charge in each pocket are to be understood as meaning that, taking each pocket separately and without reference to its position in relation to other parts, the general type of air movement in each pocket will be approximately the same and the characteristics of the fuel injection and the direction or directions of such injection in relation to the containing surface of the pocket and to the movement of the air therein, will be approximately the same for each pocket, at least during normal load running, although in some cases there may be minor variations mainly effective for example under starting, idling or low load running conditions. In other words the arrangement will be such that substantially similar combustion conditions exist in each pocket. The term air movement is used herein to include organised movement, that is to say movement in a particular pattern of flow, for example rotational or torroidal movement, or a combination of these two types of movement, as well as any other such movement as has the object of bringing as much as possible of the available air in the pocket into contact with fuel to produce as complete burning of the latter as possible during the combustion process.

In a preferred arrangement according to the invention a single fuel injection device will be provided disposed at a point between the pockets and arranged to inject fuel similarly into each of the two or more pockets. In this case the pockets conveniently communicate with a common space at their adjacent points, the end of the fuel injection device lying within or immediately opposite this space at the end of each compression stroke. In most cases each of the pockets will be of approximately circular cross-section and non-overlapping in planes normal to the cylinder axis and in this event the common space in the arrangement referred to above, may be provided by a depression lying between and communicating with the adjacent parts of the pockets.

In any case where, as is preferred, each pocket is of approximately circular cross-section in planes normal to its axis of symmetry, the arrangement will preferably be such that at the end of each compression stroke a substantial degree of organised rotation of the air charge in each pocket and approximately about the axis of the pocket takes place, during the period of fuel injection. Thus the invention may be applied to an engine of the kind in which, during the induction period, the air charge enters the cylinder in such a manner that the air charge rotates bodily about the cylinder axis at the end of the induction period, this rotation persisting during the compression period and causing rotation of the air charge in each of the pockets at the end of the compression stroke. Organised rotation of the air charge in each pocket may, however, be augmented by special formation of the piston face or cylinder head such as to tend to cause a greater part of the air forced into each pocket during the compression stroke and more particularly by the close approach of the piston to the cylinder head at the head of each compression stroke to enter the pockets in directions which are approximately tangential to circles having the axes of the pockets for centre. To this end appropriate shallow channels might be formed in the piston face.

Where such bodily rotational movement of the air charge in each pocket occurs at the end of each compression stroke the fuel injection means may be so disposed and formed as to direct fuel in a jet with the axis of the jet in a direction having a substantial component in the direction of rotational movement of the part of the air charge in the pocket adjacent to the injection means (that is to say in a "downstream" direction).

Moreover, preferably the direction of fuel injection into each pocket is substantially tangential to a circle concentric with the side wall of the pocket and of smaller radius than the pocket.

Where, as will in many cases be preferred, a single fuel injection device is provided, this may be formed so as to deliver a number of jets corresponding to the number of pockets, each jet being directed appropriately with regard to its pocket.

Thus in one arrangement where there are two or three pockets symmetrically arranged with respect to the cylinder axis, a central fuel injection device may be provided formed so as to deliver respectively two or three jets, each jet having such a direction in relation to the direction of rotation of the air charge in its pocket that the fuel injection is substantially downstream and approximately tangential to a circle concentric with the circumferential wall of the pocket.

Some of the advantages of the invention are, (1) By dividing the total quantity of air which is to be brought into contact with the fuel injected into two or more similar bodies each in a pocket of similar form and having similar air movement characteristics, it is more readily possible to control the distribution of fuel in the air than where a single pocket of at least twice the volumetric dimensions is employed;

(2) It is well known that for any given rotational air speed generated in the cylinder during the induction or air charging period the rotational speed of the air charge when transferred into a single combustion chamber pocket varies somewhat inversely as the diameter of the pocket. When two or more combustion chamber pockets are employed the diameter of each is appreciably less than that of a single pocket and consequently it is more readily possible to attain the desired rotational speed of the air charge in each of the combustion chamber pockets whereby an efficient combustion process is obtained with the use of a single fuel jet disposed in each pocket without resorting to an excessively high velocity of the air stream through the inlet valve, thus enabling a higher engine volumetric efficiency to be obtained and consequently a greater useful operating speed range and a higher maximum power output.

(3) Where the combustion pockets communicate with one another by a communicating space between their adjacent parts, a single fuel injection device which may be centrally disposed, or nearly so, in the cylinder head, as is usually convenient, can be employed while yet enabling satisfactory fuel distribution in the air without excessive injection pressure and with a number of jets corresponding only to the number of pockets.

Figures 2, 3:
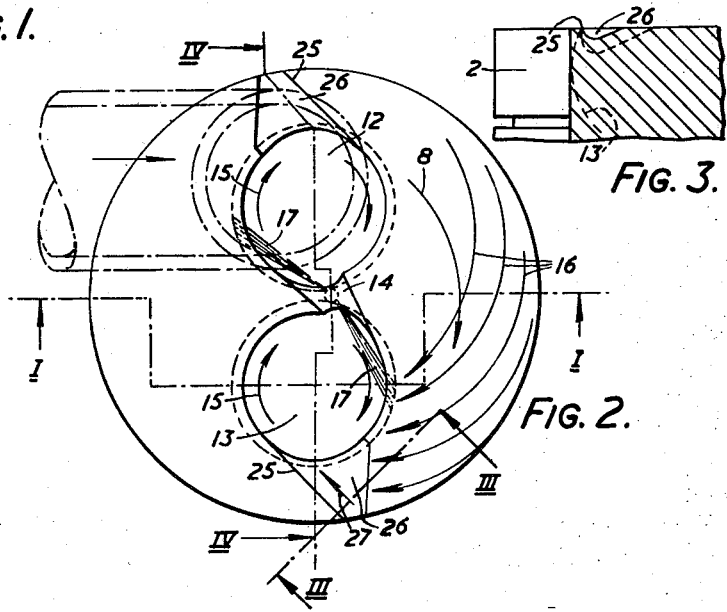
Figure 4:
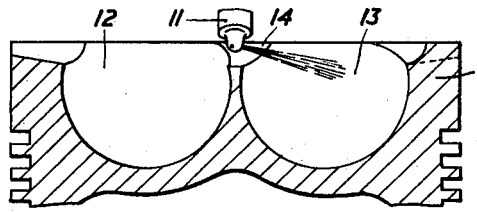
Figure 5:
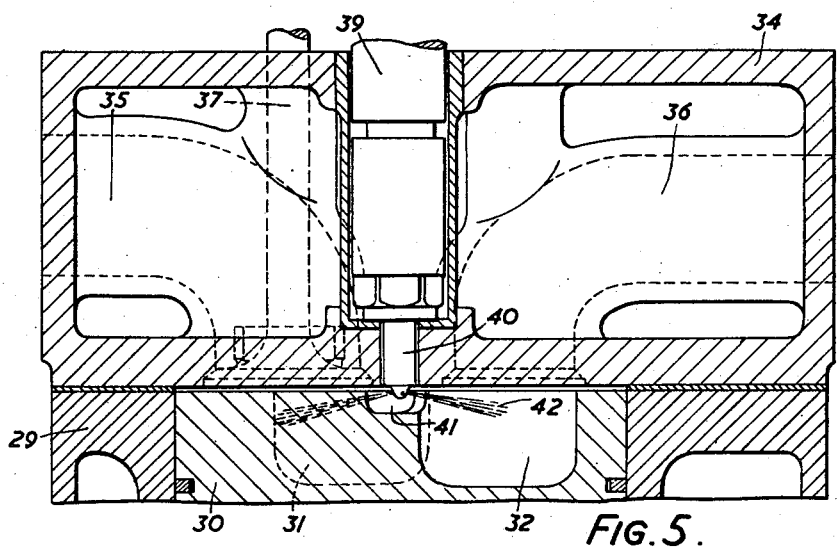
Figure 6:
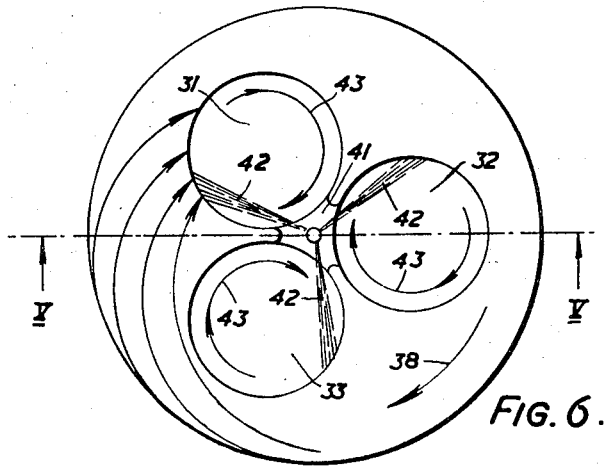
Figure 7:
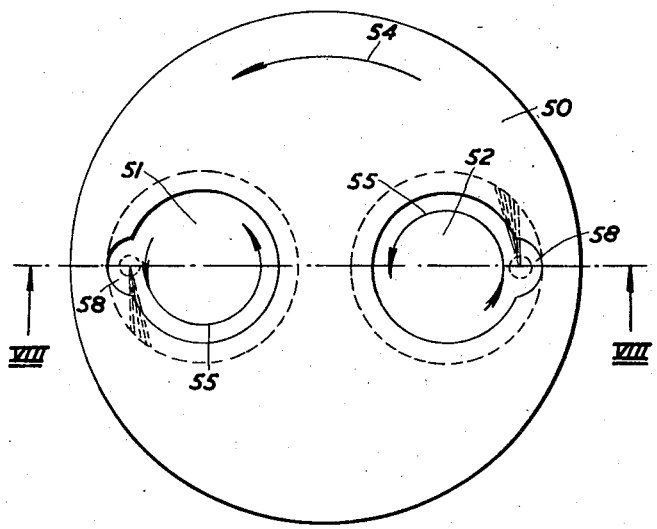
Figure 8:
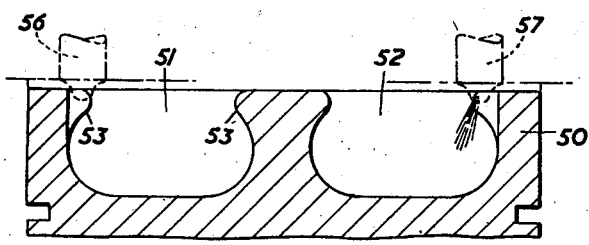
Figures 9, 10:
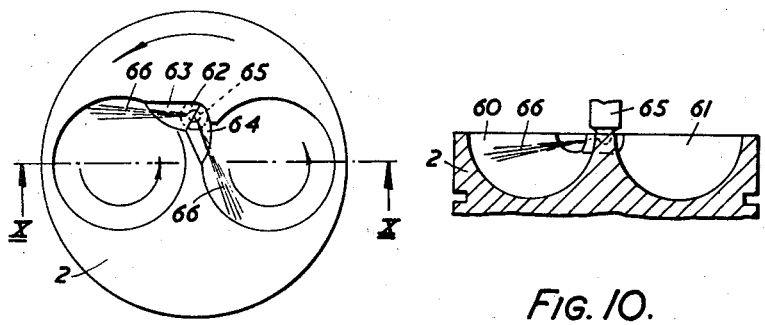
Figures 11, 12:
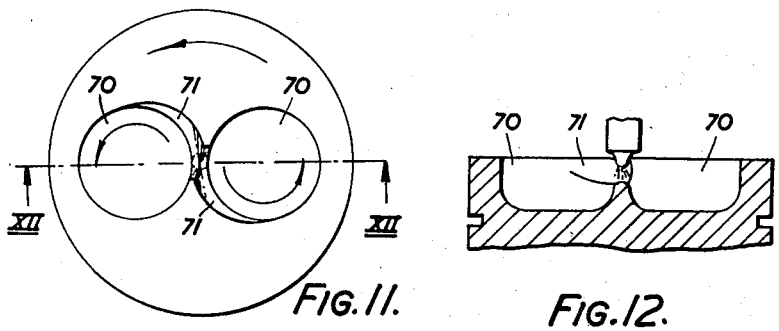
Figures 13, 14:
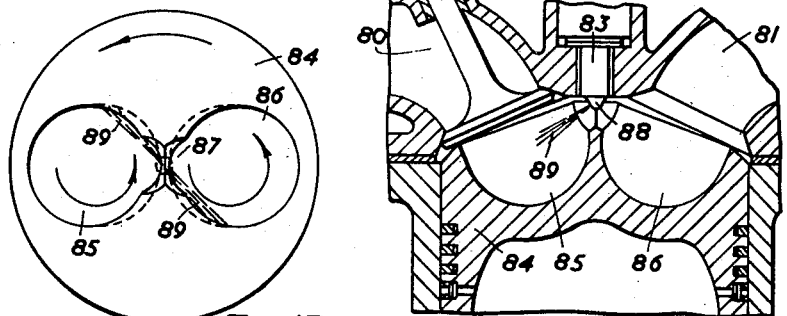

The accompanying drawings show somewhat diagrammatically by way of example a number of typical constructions according to the invention. In the drawings:

Figure 1 is a sectional side elevation of the upper part of the cylinder and the cylinder head of one form of construction according to the invention, the section of the piston being on the line 1—1 of Figure 2, Figure 2 is a plan view of the piston of the engine shown in Figure 1, Figure 3 is a fragmentary sectional elevation of the piston on the line 3—3 in Figure 2, Figure 4 is a cross-section of the upper part of the piston shown in Figure 2, the section being on the line 4—4 of Figure 2, Figures 5 and 6 are views corresponding to Figures 1 and 2 of an alternative construction incorporating three combustion chamber pockets, Figures 7 and 8 are respectively plan and sectional elevations of another alternative piston including two quite separate combustion pockets, and separate fuel injection nozzles, Figures 9 and 10 are similar views to Figures 2 and 4 of another construction according to the invention, Figures 11 and 12 are similar views to Figures 2 and 4 of another construction according to the invention, and Figures 13 and 14 are similar views of yet another construction in which the axes of symmetry of the pockets are inclined to the cylinder axis.

In the construction shown in Figures 1, 2, 3 and 4 the engine comprises a cylinder 1 in which is arranged to reciprocate a piston 2, the piston having a flat crown as indicated at 3 in which are formed combustion pockets, the cylinder being closed by a cylinder head 4 containing inlet and exhaust ducts terminating in ports opening into the cylinder and controlled by poppet valves in generally known manner the inlet passage being indicated at 5, the inlet port at 6 and the inlet valve at 7. The disposition and form of the inlet passage 5 and port 6 is such in relation to the bore of the cylinder that in known manner the air charge entering the cylinder through the inlet port during each induction period is caused to rotate about the cylinder axis in a manner indicated by the arrow 8 in Figure 2. The cylinder head 4 is provided with a built in housing 9 for a fuel injection device 10 of known type having a nozzle 11, the nozzle being of the valve controlled type and being provided with two injection apertures disposed as hereinafter described.

The fuel injector is slightly inclined to the cylinder axis, and the nozzle tip is slightly off-set laterally from the cylinder axis as shown in Figure 2. The two injection apertures in the nozzle are accordingly formed and positioned to direct the two jets of fuel at an obtuse angle to one another, thus maintaining similar fuel distribution characteristics in the two pockets.

In the construction shown in Figures 1, 2, 3 and 4 the crown of the piston 2 has formed therein two similar combustion pockets 12 and 13 symmetrically disposed on opposite sides of the cylinder axis and communicating with one another where their circumferences approach close to one another through a common space 14. As will be seen from Figures 1 and 4, the general form of each of the pockets 12 and 13 is part spherical and somewhat greater than hemispherical, while the space 14 is formed by a depression in the form of a groove tangential to the walls of the two pockets. It will be noted that the envelopes of the main spherical surfaces of the two pockets do not overlap although the pockets communicate with one another through this groove.

It will also be noted that the "mouth" or upper end of each pocket is of somewhat smaller diameter than the maximum diameter of the pocket.

As will be seen from Figure 2, the rotation of the air charge in the cylinder as indicated by the arrow 8 will, at the end of each compression stroke, when substantially the whole of the air charge has been forced into the pockets 12 and 13, cause the air charge in each pocket to be in a state of rotation as indicated by the arrows 15. The air charge rotating bodily within the cylinder bore may be regarded as entering the pockets during the compression stroke in the general direction of arrows 16. To assist in creating the required rotational movement within each pocket the piston crown is provided with two grooves 26 each of which runs into one of the pockets 12 and 13, from the circumferential edge of the piston crown, with a substantial tangential component of direction. Each groove increases progressively in depth and width from its outer end to its inner end where it enters the pockets, and it will be seen from Figure 3 that each groove is somewhat deeper adjacent the edge 25, which is tangential to the respective pocket. These grooves tend to cause the high velocity circumferential portion of the air charge rotating with the cylinder to enter the pockets 12 and 13 tangentially as indicated by the arrows 27 during the compression stroke and also cause an appreciable proportion of the rotating air charge which is rapidly displaced from the cylinder space into the pockets towards the end of the compression stroke to be caused to enter the pockets 12 and 13 tangentially as indicated by the arrows 27 and this appreciably increases the rate of bodily rotation of the air charge about the axis of the pocket.

The fuel injection device 10 is, as stated above, formed to direct two jets of fuel, the general form and direction of these jets being indicated clearly in the drawings at 17, the said direction being substantially "downstream" with reference to the rotation of the air charge in each pocket, and tangential to a circle concentric with the side wall of the pocket and of substantial diameter, but somewhat smaller diameter than the pocket itself in a transverse plane through the nozzle tip of the fuel injection device.

In the construction shown in Figures 5 and 6, the engine comprises a cylinder 29 in which is arranged to reciprocate a piston 30, the crown of which has a flat upper surface in which three combustion pockets 31, 32, 33 are formed in the manner hereinafter described. The cylinder is closed by a cylinder head 34 having inlet and exhaust passages 35, 36 controlled by poppet valves in known manner. The inlet valve which is indicated at 37 is of the "masked" type so that the air flowing through it enters the cylinder bore tangentially and the air charge in the cylinder at the end of each suction stroke is thereby caused to be in a state of bodily rotation about the cylinder axis as indicated by the arrow 38 in Figure 6. The cylinder head is provided with a housing in which is disposed a fuel injection device 39 the nozzle 40 of which lies on the axis of the cylinder and is formed to deliver three jets of fuel in the manner hereinafter referred to.

The three similar combustion pockets 31, 32, 33 are of generally cylindrical form and equally spaced about the cylinder axis, and communicate with one another through a common space 41 of the form indicated in the drawings. The fuel injection nozzle 40 lies at the centre of the space 41 at the end of the compression stroke and is formed to deliver three jets of fuel 42 as indicated in the drawings. It will be seen that in this construction also the bodily rotation of the air charge about the cylinder axis in the direction of the arrow 38 causes bodily rotation of the air in each of the pockets 31, 32, 33, in the manner indicated by the arrows 43 at the end of the compression stroke, the direction of each of the fuel jets 42 being downstream with respect to this rotation.

In the construction illustrated in Figures 7 and 8 the piston crown 50 is formed with two entirely separate non-communicating spaced combustion pockets 51, 52, each of generally cylindrical form but with a smoothly rounded narrowing or constriction 53, adjacent its upper end or mouth. The diameter of the pocket increases again above the constriction to form a bell mouth as illustrated in cross-section in Figure 8. As in the previous examples the main air charge within the cylinder is caused to rotate in the direction of the arrows 54 the consequent rotation movement of the air in the combustion pockets being indicated by arrows 55.

In this example the cylinder head may be basically similar to that illustrated in Figure 1, but two separate fuel injection devices with nozzles 56, 57 are provided, each aligned with a small semi-cylindrical recess 58 in the side wall of the respective combustion pocket, and arranged to direct a jet of fuel in a direction substantially downstream in relation to the movement of air within the pocket.

In the further modification shown in Figures 9 and 10 the pockets 60 and 61 are of hemispherical form as shown in Figure 10 and communicate with one another through a common space 62 comprising two short straight channels 63, 64, lying at an angle to one another with the nozzle 65 of the injection device at their junction. Each channel is approximately tangential to the wall of the respective pocket. In this arrangement the injection device is formed to deliver two fuel jets 66 respectively along the two channels 63 and 64 as indicated in the drawings.

In the modification shown in Figures 11 and 12 the arrangement is generally similar to that shown in Figures 1, 2, 3 and 4, except that each pocket 70 is of generally cylindrical form, and includes an arcuate recess 71, at the upper edge of each pocket and on the side thereof adjacent to the other pocket. The outer surfaces of these recesses are part of surfaces of revolution about axes lying on the straight line joining the axes of the pockets but nearer to one another than those axes, and with a radius of curvature approximating to that of the main side wall of each pocket.

In the modification shown in Figures 13 and 14 the invention is shown as applied to an engine having inlet and exhaust ports 80, 81 controlled by inclined poppet valves, one of which is indicated at 82, the inlet and exhaust passages leading away from the ports in opposite directions in conventional manner. A fuel injection device 83 is positioned centrally in the cylinder head and coaxial therewith. In this construction a piston 84 having an approximately hemispherical upper face is formed with two generally hemispherical pockets 85, 86, the axes of symmetry of the two pockets being inclined somewhat from the axis of the cylinder and approximately parallel to the axis of the inlet and outlet ports 80, 81 where they enter the combustion space. The two combustion pockets 85, 86 communicate with one another through a common space 87 formed by a further intermediate depression in the crown of the piston, and the nozzle tip 88 of the fuel injection device is arranged to lie partly within this space when the piston is at the end of the compression stroke, as indicated in Figure 14. In this case the fuel injection device is provided with two oppositely positioned injection apertures arranged to direct jets of fuel 89 into the combustion pockets in a generally downstream direction, as illustrated in the drawings.

What I claim as my invention and desire to secure by Letters Patent is:

1. An internal combustion engine of the liquid fuel injection compression ignition type comprising a piston and cylinder providing between the piston and cylinder head at the end of each compression stroke at least two approximately similar combustion pockets each of approximately circular cross-section in planes normal to the piston axis and having a circumferential part which lies adjacent to the periphery of the piston and a circumferential part which lies adjacent to the piston axis, air inlet means causing bodily rotation of the air charge in the cylinder during each inlet period and subsequent compression stroke and hence bodily rotation of the air charge compressed into each pocket about the axis of said pocket, and means for injecting fuel approximately similarly into the air charge in each pocket.

2. An internal combustion engine as claimed in claim 1, including grooves formed in the piston crown and extending inwards from points adjacent to the outer circumferential wall of the cylinder respectively into the pockets, the direction of each groove being tangential with respect to a circle having the axis of its associated pocket for center and the direction of air flow along each groove into its associated pocket having a substantial component in the direction of rotation of the air charge in the pocket caused by the bodily rotation of the air charge in the cylinder.

3. An internal combustion engine as claimed in claim 2, in which the cross-sectional area of the part of each pocket where it enters the cylinder bore is less than the cross-sectional area of the part lying more remote from the piston face, the air charge thus entering each port through a restricted mouth or neck.

4. An internal combustion engine as claimed in claim 3, in which each pocket is of part-spherical form.

5. An internal combustion engine as claimed in claim 4, in which the direction of fuel injection into each pocket has a large component parallel to the direction of movement of the adjacent part of the air charge in said pocket and is towards a part of the circumferential wall of the pocket.

6. An internal combustion engine as claimed in claim 1, in which the direction of fuel injection into each pocket has a large component parallel to the direction of movement of the adjacent part of the air charge in said pocket and is towards a part of the circumferential wall of the pocket.

7. An internal combustion engine as claimed in claim 6, including grooves formed in the piston crown and extending respectively into the pockets from points adjacent to the outer circumferential wall of the cylinder, the direction of air flow into each pocket along its associated groove being tangential to a circle having the axis of the pocket for centre and having a substantial component in the direction of rotational movement of the air charge in the pocket caused by the bodily rotation of the air charge in the cylinder.

8. An internal combustion engine as claimed in claim 1, in which the pockets communicate with one another through a recess having a depth substantially less than the depth of the pockets and including a fuel injection device arranged to inject fuel from an intermediate point in said recess into the pockets.

9. An internal combustion engine as claimed in claim 8, in which the direction of fuel injection into each pocket is substantially tangential to a circle having the axis of the pocket for center and towards a part of the circumferential wall of the pocket adjacent to the said recess and on the side of that recess opposite to that from which the rotating air charge in the pocket approaches the recess.

10. An internal combustion engine as claimed in claim 9, in which the cross-sectional area of the part of each pocket lying nearer the piston face is smaller than that of the part of the pocket lying more remote from said face, whereby each pocket communicates with the cylinder bore through a restricted mouth or neck.

11. An internal combustion engine as claimed in claim 1, in which the pockets communicate with one another only through the part of the cylinder bore lying outside them, and separate fuel injection nozzles are provided for injecting fuel respectively into each pocket.

References Cited in the file of this patent

UNITED STATES PATENTS

| | | |
|---|---|---|
| 1,662,553 | Wilking | Mar. 13, 1928 |
| 2,104,150 | Bremser | Jan. 4, 1938 |
| 2,360,943 | Fisher | Oct. 24, 1944 |
| 2,644,433 | Anderson | July 7, 1953 |

FOREIGN PATENTS

| | | |
|---|---|---|
| 767,537 | France | May 1, 1934 |
| 631,134 | Germany | June 13, 1936 |